Patented Aug. 7, 1945

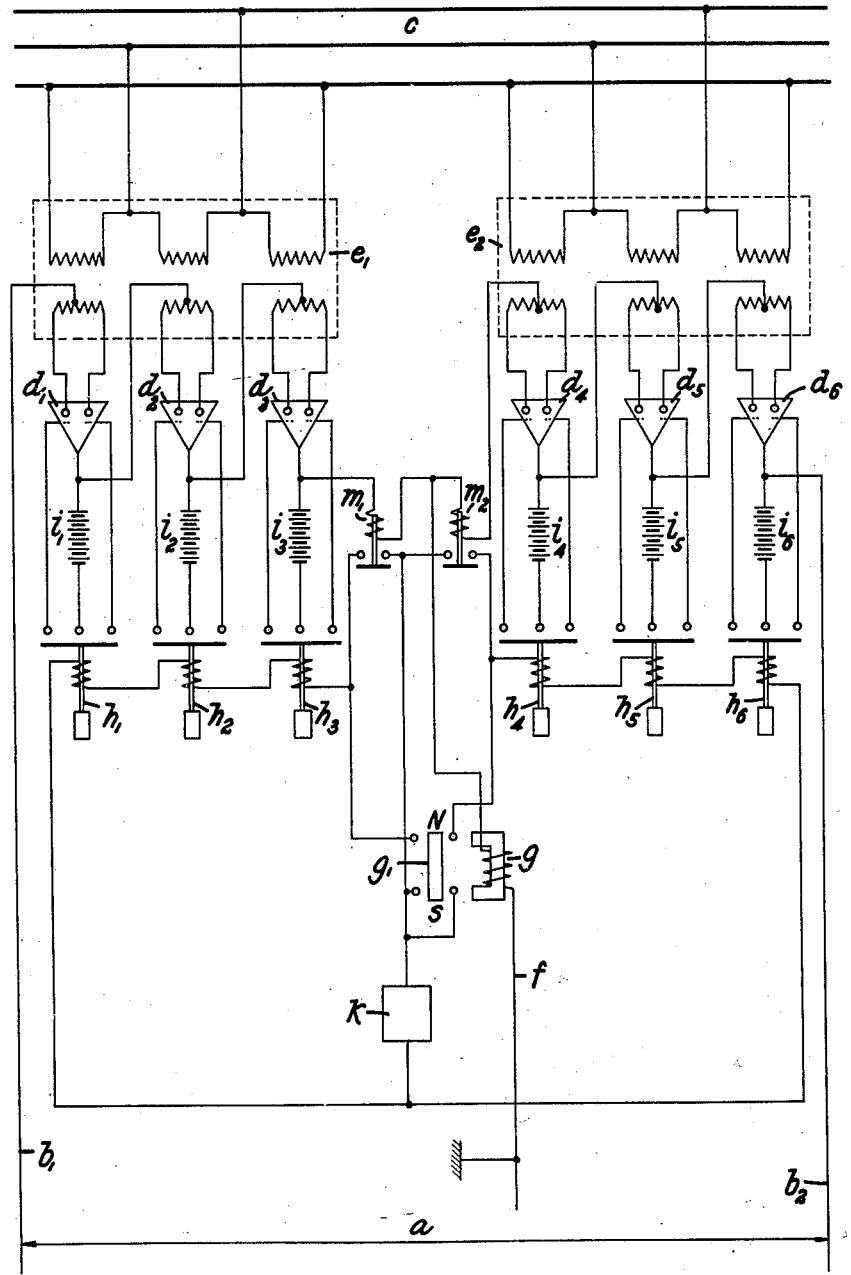

2,381,668

UNITED STATES PATENT OFFICE 2,381,668

EARTH FAULT PROTECTION ARRANGEMENT

Julius Jonas, Zurich, Switzerland, assignor to Aktiengesellschaft Brown, Boveri & Cie., Baden, Switzerland Application July 16, 1943, Serial No. 495,023
In Switzerland March 27, 1942

9 Claims. (Cl. 175—363)

For earth fault protection of direct-current high voltage networks which are supplied from controllable discharge tubes arranged in rectifier connection or rectifier-inverter (so-called figure eight) connection, it has been proposed to connect an internal voltage point of the series over a protective relay with earth. The protective relay is actuated by the earth fault current flowing in the earth conductor and connects the grids of all discharge tubes or at least of part of same to a negative potential source which blocks the current path.

The object of the present invention is to construct this earth fault protection arrangement so that on the occurrence of an earth fault only those discharge tubes are put out of operation which lie between the network conductor which has an earth fault and the earth conductor, whilst the discharge tubes between the earth conductor and the sound network conductor are maintained in service. According to the invention this is achieved by using for the protective relay a selectively operating relay which on the occurrence of an earth fault on a network conductor according to the direction of the earth fault current in the earth conductor only renders that part of the series of discharge tubes inoperative which lies between the earth conductor and the network conductor which has the earth fault.

A constructional example of the invention is illustrated diagrammatically in the accompanying drawing.

$a$ indicates the high-voltage direct-current network with the conductors $b_1$, $b_2$ which are supplied from the three-phase network $c$ over the recitifiers $d_1$ to $d_6$. The supply transformers for the rectifiers are designated by $e_1$, $e_2$. The rectifiers $d_1$ to $d_6$ are connected in series and the mid-point of the series is connected to earth over the central conductor $f$ of the direct-current network. $h_1$—$h_6$ are grid control relays which apply a negative blocking potential from the voltage sources $i_1$ to $i_6$ to the grids located in front of the rectifier anodes. The selectively operating relay $g$ with the polarized armature $g_1$ is located in the earthed middle conductor $f$. $k$ is an auxiliary current source for the excitation of the grid control relays which can also be supplied from the direct current network.

The method of operation of the arrangement is as follows:

If there is an earth fault, for instance on the network conductor $b_2$, the earth fault current flows over the earthed middle conductor $f$ and excites the selective relay $g$ so that its armature is attracted to the right. A current then flows from the auxiliary current source $k$ over the contacts of the selective relay $g$ through the excitation coils of the grid control relays $h_4h_5h_6$ whose armatures connect the control grids of the anodes of the rectifiers $d_4d_5d_6$ with the negative pole of the grid bias sources $i_4i_5i_6$. The rectifiers $d_4d_5d_6$ are thus blocked whilst the rectifiers $d_1d_2d_3$ continue to function. When an earth fault occurs on the network conductor $b_1$ the rectifiers $d_1$ to $d_3$ are blocked in a corresponding manner by means of relays $h_1$ to $h_3$, whilst the rectifiers $d_4$ to $d_6$ continue to operate.

For the protective relay it is advisable to use a high-speed relay. The protective relay $g$ can be so constructed that upon the occurrence of an earth fault the control devices of the discharge tubes (rectifiers) located on the side of the earth fault are actuated in such a manner that the arc path in said tubes is at least momentarily blocked. As soon as the fault disappears relay $g$ releases its armature, no current flows through the excitation coils of the grid control relays and the rectifiers on the fault side are made operative or switched over again.

If during the time when, due to an earth fault on one of the network conductors, the rectifiers which are located between this conductor and the eathed control conductor are blocked, an excess current occurs on that side where the network conductor has no earth fault, then the excess current relay $m_1$ or $m_2$ associated with this side of the network comes into action. These excess-current relays are so constructed that they operate with such a time delay when compared with the earth fault protective relay, that in the case of a single pole earth fault they only operate after the earth fault relay has ceased to function and when the current on the fault-free side of the direct current network exceeds a certain maximum value. The armatures of the excess-current relays $m_1$, $m_2$ control contacts in the excitation circuit of the grid control relays $h_1$ to $h_6$ containing the auxiliary source $k$ and which apply to the anode grids of the rectifiers the blocking potentials from the grid bias sources $i_1$ to $i_6$.

If, after the high speed selective protective relay $g$ has operated, the earth fault on the network conductor in question has disappeared, then no current flows through the relay coil. In order that, after relay $g$ has operated upon the occurrence of an earth fault on one of the network conductors, the armature $g$ which has been moved from its position of rest should be prevented from being moved into a position opposite to the initial position of attraction by the current which flows through the relay coil in the opposite direction from the fault-free network side, thus causing a blocking of the rectifiers on that side of the network conductor which is not disturbed, it is necessary that the protective relay should be provided with a damping means so that the closing motion is quicker than the return motion. It is expedient to construct the protective relay so that it operates like a continuous fault clearing circuit breaker of the kind used for network protection. Relay $g$ can then be constructed so that after a number of operations it is locked in its "on" position. In the case of a simultaneous earth fault on both conductors of the direct-current network, which corresponds to a short-circuit between the conductors, it is necessary to ensure that the devices which retard the rapid movement of the excess-current relays $m_1$, $m_2$ are rendered inoperative. The excess-current relays then operate without delay and their contacts close the excitation circuits of the grid control relays $h_1$ to $h_6$, so that all rectifiers are blocked and the protective relay $g$ does not operate.

I claim:

1. An arrangement for the earth fault protection of a direct-current network, particularly for high voltages supplied by controllable discharge tubes connected in series, where an inner voltage point of said series is earthed through a protective relay which is actuated by the earth fault current flowing through the earth conductor, characterised by the feature that a selectively operating relay is used as the protective relay which on the occurrence of an earth fault on one of the network conductors depending upon the direction of the earth fault current in the earth conductor only renders that part of the series of discharge tubes non-conductive which lie between the earth conductor and the network conductor which has the earth fault.

2. An arrangement as in claim 1, characterised by the feature that the protective relay is a high speed polarised relay.

3. An arrangement as in claim 1, characterised by the feature that the protective relay on the occurrence of an earth fault actuates the control devices of the discharge tubes located on the side where the earth fault occurs so that the arc path in said tubes is at least temporarily blocked.

4. An arrangement as in claim 1, characterised by the feature that on the occurrence of an earth fault the control devices of those discharge tubes located on the side where the earth fault occurs are actuated in such a manner that said tubes operate as inverters at least temporarily.

5. An arrangement as in claim 1, characterised by the feature that the protective relay is so constructed that the relay armature is picked up more quickly than it drops off.

6. An arrangement as in claim 1, characterised by the feature that the protective relay is arranged to operate with continuous fault clearance.

7. An arrangement as in claim 1, characterised by the feature that the earth conductor is an earthed middle conductor.

8. An arrangement as in claim 1, characterised by the feature that at each side of the branching point for the earth conductor in series with the corresponding network conductor an excess-current relay is provided which compared with the earth fault protective relay operates with such a time delay that in the case of a single pole earth fault it only operates after said protective relay has ceased to function and the current on the fault-free side of the direct-current has exceeded a certain maximum value.

9. An arrangement as in claim 1, in combination with an excess current relay at each side of the branching point for the earth conductor and in series with the corresponding network conductor, and a delay device for imparting to each excess current relay such a time delay that in the case of a single pole earth fault the excess current relay operates only after the protective relay has ceased to function and the current on the fault-free side of the direct-current has exceeded a certain maximum value, said time delay devices being inoperative upon the occurrence of a short-circuit between the network conductors.

JULIUS JONAS.